(12) United States Patent
Kennedy et al.

(10) Patent No.: US 6,384,147 B1
(45) Date of Patent: May 7, 2002

(54) POLY(VINYL CHLORIDE)-G-POLY(α-METHYLSTYRENE) HAVING A SINGLE GLASS TRANSITION TEMPERATURE

(75) Inventors: Joseph P. Kennedy; Zhengjie Pi, both of Akron, OH (US)

(73) Assignee: University of Akron, Akron, OH (US)

( * ) Notice: Subject to any disclaimer, the term of this patent is extended or adjusted under 35 U.S.C. 154(b) by 0 days.

(21) Appl. No.: 09/811,938

(22) Filed: Mar. 19, 2001

(51) Int. Cl.[7] ............... C08F 259/02; C08F 259/04; C08F 259/06
(52) U.S. Cl. .............. 525/292; 525/104; 525/317
(58) Field of Search ................. 525/292, 104, 525/317

(56) References Cited

U.S. PATENT DOCUMENTS 3,904,708 A    9/1975    Kennedy et al.

OTHER PUBLICATIONS

Synthesis and Characterization of Poly(vinyl Chloride–g–α–Methylstyrene)–A New Thermoplastic Resin. 2 by P.D. Trivedi et al., Journal Macromolecular Science–Chemistry, A17(7), pp. 1159–1168, 1982.

*Primary Examiner*—James J. Seidleck
*Assistant Examiner*—Olga Asinovsky
(74) *Attorney, Agent, or Firm*—Hudak & Shunk Co., L.P.A.

(57) ABSTRACT

A grafted poly(vinyl chloride) having at least one pendant chain which comprises poly(α-methylstyrene). The graft copolymer has only a single glass transition temperature of from about 100° C. to about 130° C. The poly(vinyl chloride)-g-poly(α-methylstyrene) can be utilized as a high heat distortion poly(vinyl chloride) material, as the single glass transition temperature is considerably higher than that of homopolymer poly(vinyl chloride). The molecular weight of the pendant poly(α-methylstyrene) chain is less than about 10,500 g/mol number average.

22 Claims, No Drawings

POLY(VINYL CHLORIDE)-G-POLY(α-METHYLSTYRENE) HAVING A SINGLE GLASS TRANSITION TEMPERATURE

FIELD OF THE INVENTION

The present invention relates to aromatic compounds such as α-methylstyrene grafted on a halogenated polymer backbone, preferably poly(vinyl chloride), wherein the graft copolymer has a single glass transition temperature. A method for preparing the graft copolymer is also disclosed. The poly(vinyl chloride)-g-poly(α-methylstyrene) importantly can be utilized as a compatibilizing agent or as a high heat distortion poly(vinyl chloride) material, and the single glass transition temperature is considerably higher than that of homopolymer poly(vinyl chloride).

BACKGROUND OF THE INVENTION

Various monomers and polymers have been grafted onto halogenated polymer backbones, such as poly(vinyl chloride). The resulting grafted halogen copolymers reportedly exhibit widely varying properties.

U.S. Pat. No. 3,904,708 to Kennedy relates to an aluminum trialkyl and aluminum dialkyl monohalide catalysts which can be used to graft cationically polymerizable monomers, such as styrene, chloroprene, isobutylene, etc. to halogenated polymers with some highly reactive halogen atoms such as polyvinyl chloride),neoprene, chlorobutyl, etc.

Trivedi, Ambrose, and Altenau in *The Journal of Macromolecular Science-Chemistry*, A17(7), pp.1159–1168 (1982) article entitled "Synthesis and Characterization of Poly(vinyl Chloride-g-α-Methylstyrene)-A New Thermoplastic Resin. 2" state that α-methylstyrene was grafted on poly(vinyl chloride) using $Et_2AlCl$, $Et_3Al$, and $Me_3Al$ coinitiators and $CH_2Cl_2$ as solvent or suspending agent. Grafting was reportedly shown to be feasible using both solution and suspension techniques. High grafting efficiency and low monomer conversion were reportedly obtained using $Et_3Al$ and $Me_3Al$, while low grafting efficiency but high conversion could be obtained using $Et_2AlCl$ coinitiator. This paper discusses the synthesis, characterization and some mechanical properties of α-methylstyrene grafted poly(vinyl chloride) and reported that two glass transition temperatures (Tg) were obtained. This suggests that the moieties of the graft copolymer are incompatible with each other.

SUMMARY OF THE INVENTION

The grafting of aromatic compounds, preferably vinyl substituted aromatics such as poly(α-methylstyrene), onto halogenated backbones such as poly(vinyl chloride) is described. Unexpectedly, the graft polymer has a single glass transition temperature. The single glass transition temperature of the polyvinyl chloride)-g-poly((α-methylstyrene) is considerably higher than ungrafted homopolymer poly(vinyl chloride) thus can be utilized as a high heat distortion polymer. The poly(vinyl chloride)-g-poly(α-methylstyrene) can further be utilized as a compatibilizing agent for blends of poly(vinyl chloride) and poly (α-methylstyrene) as well as for other polymers made from vinyl substituted aromatic monomers.

DETAILED DESCRIPTION OF THE INVENTION

The halogenated polymers, including chlorine containing polymers such as poly(vinyl chloride) utilized by the present invention are well known to the art and to the literature. The polymerization of vinyl chloride monomer to poly(vinyl chloride), in addition to the regular —$CH_2CH(Cl)$— repeat units, also inherently results in the presence of a very small quantity of active or labile chlorines. The presence of labile chlorines influences the thermal, oxidative, and chemical stability of the poly(vinyl chloride) resin. The labile chlorines in poly(vinyl chloride) can be substituted with aromatic compounds such as α-methylstyrene as described hereinbelow.

The chlorine containing polymers suitable for use in the present invention are thermoplastics well known to those skilled in the art. The term "chlorine containing polymers" includes both polymers derived from chlorine-containing monomers, as well as polymers that are chlorinated during or after polymerization. Examples of such chlorine containing polymers include vinyl chloride homopolymers (PVC), chlorinated PVC (CPVC), and polyvinylidene chloride. Homopolymer poly(vinyl chloride) (PVC) is the preferred chlorine containing polymer. In addition, copolymers derived from the chlorine containing polymers and other comonomers can be utilized in the invention. Some preferred comonomers include, but are not limited to, vinyl acetate, α-methylvinyl chloride, vinylsterate, vinylbenzoate, vinylidene chloride, vinyl bromide, vinyl fluoride, tetrafluoroethylene, chlorotrifluoroethylene, acrylonitrile, acrylates and methacrylates optionally substituted and containing from 1 to about 20 and desirably from about 2 to about 10 carbons atoms in the ester group, or combinations thereof. When a comonomer is utilized, the amount of comonomer ranges generally from about 0.01 to about 10 or 20 parts by weight, desirably from about 0.1 to about 10 parts by weight, and preferably from about 0.5 to about 5 parts by weight based upon 100 parts by weight of the comonomer and chlorine containing polymer.

Hereinafter, chlorine containing polymers include a homopolymer of vinyl chloride, chlorinated poly(vinyl chloride) (CPVC), or polyvinylidene chloride, or copolymers thereof as described above. Likewise, other halogenated polymers such as bromine and fluorine containing polymers, e.g. poly(vinyl bromide) and poly(vinyl fluoride), can be substituted for or used in conjunction with the chlorine containing polymers of the present invention.

The poly(vinyl chloride) and other chlorine containing polymers of the present invention contain, in addition to "normal" secondary chlorines, labile allylic and/or tertiary chlorines as well. It is believed that poly(vinyl bromide) and poly(vinyl fluoride) also contain labile bromines and fluorines. The low thermal stability of poly(vinyl chloride) is due to the presence of a small but critical amount of labile chlorine such as an end-allylic structure (I), internal-allylic structure (II), and tertiary structure (III) wherein R° is a poly(vinyl chloride) chain branch. It is the labile chlorine that provides active sites for the above-noted grafting process.

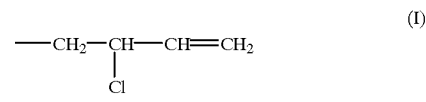

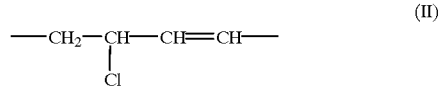

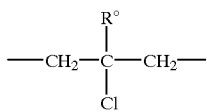

(III)

The chlorine containing polymers or copolymers utilized by the present invention are widely available commercially from such sources as the Geon Company as Geon® Resin 110×377 (poly(vinyl chloride)), The chlorine containing polymers can be used as purchased or can also be purified before use, such as by precipitation from THF into excess methanol, which is then dried, such as in a vacuum oven at room or elevated temperature, before use.

The number average molecular weight of the chlorine containing polymers or copolymers utilized by the present invention is generally from about 5,000 to about 100,000, desirably from about 10,000 to about 75,000, and preferably from about 15,000 to about 50,000 per polymer chain. The number of vinyl substituted aromatic branches that can be grafted onto the chlorine containing polymers or copolymers range generally from about 1 to about 50, desirably from about 1 to about 30, and preferably from about 1 to about 10 pendant polymer graft chains per halogen or chlorine containing polymer chain. The degree of polymerization of the chlorine containing polymers or copolymers ranges generally from about 50 to about 2,000, and preferably from about 100 to about 1,000.

The aromatics of the present invention include vinyl substituted aromatics containing a total of from 8 to about 12 carbon atoms and include styrene, α-methylstyrene, and the like with (α-methylstyrene being preferred. α-Methylstyrene is commercially available from Aldrich of Sheboygan, Wis.

The grafting of aromatic compounds from the chlorine containing polymer is carried out in a reaction vessel fitted with a stirrer or other agitating means and heating and/or cooling means. The grafting is conducted in the presence of an inert gas such as nitrogen, argon, and the like, in order to graft under controlled or inert conditions.

Desirably, the chlorine containing polymer is dissolved by using appropriate polar halogenated hydrocarbon solvents containing a total of from 1 to about 6 or about 12 carbon atoms, such as 1,2-dichloroethane, methylene chloride, methyl chloride, chloroform, chlorobenzene, and dichlorobenzene, or combinations thereof. Preferred solvents include 1,2-dichloroethane, and methylene chloride. Enough solvent is utilized so that the chlorine containing polymer is present in solution in an amount generally from about 0.1 to about 10.0, desirably from about 0.2 to about 5.0, and preferably from 0.50 to about 2.50 percent by weight based on the total weight of the chlorine containing polymer and solvent.

The solution of chlorine containing polymer is placed in the reactor vessel. Suitable reaction temperatures generally range from about minus 90° C. to about 50° C., desirably from about minus 70° C. to about 25° C. or 30° C., and preferably from about minus 50° C., minus 30° C., or minus 25° C. to about 20° C. or 25° C. The desired aromatic compound is then added to the solution in an amount generally from about 0.1 to about 1.5 and preferably from about 0.2 to about 1.0 moles per liter of solvent.

One or more Friedel-Crafts acids are also added to the solution, to serve as grafting catalyst. Such Friedel-Crafts acids include, but are not limited to, titanium tetrachloride, diethylaluminum chloride, boron trichloride, ethyl aluminum dichloride, aluminum chloride, tin tetrachloride, dialkylaluminum dichloride, trialkylaluminum chloride wherein each alkyl, independently, has from 1 to about 6 carbon atoms, and the like, with diethylaluminum chloride and dialkylaluminum dichloride being preferred. The amount of Friedel-Crafts acid utilized generally is from about $1\times10^{-3}$ to about $1\times10^{-1}$ moles per liter, desirably from about $1\times10^{-2}$ to about $8\times10^{-2}$ moles per liter, and preferably from about $2\times10^{-2}$ to about $6\times10^{-2}$ moles per liter of solution. In order to maintain consistency of temperature, the catalyst is preferably added incrementally over a period of time.

The reaction solution is mixed and allowed to proceed for a suitable amount of time, generally from about 1 minute to about 120 or 180 minutes, desirably from about 5 minutes to about 60 minutes, thus forming the chlorine containing polymer-g-poly(aromatic compound) of the present invention. The reaction is then terminated with an alcohol having from 1 to 5 carbon atoms or an amine, utilizing an excess to precipitate the grafted chlorine containing polymer. Suitable alcohols include methanol, ethanol, and propanol. Methanol and ethanol are preferred.

The solvents are then evaporated, leaving the chlorine containing polymer-g-poly aromatic compound plus catalyst residues. If desired, the grafted chlorine containing polymers can be purified by re-dissolving in tetrahydrofuran, cyclohexanone, or any other suitable chlorine containing polymer solvent, and centrifuged for any desirable amount of time, such as approximately one hour, to remove residues such as small amounts of metal oxide.

The number average molecular weight of each resulting aromatic branch graft of the copolymer is generally from about 500 to about 10,500, desirably about 3,000 to about 9,000 or 10,000, and preferably about 5,000 to about 9,000. It is believed that confining the molecular weight of the aromatic branch of the graft copolymer within the stated ranges allows the graft copolymer to have a single glass transition temperature. The single glass transition temperature, as explained hereinbelow, indicates compatibility between the halogenated polymers and grafted aromatic compounds. Surprisingly, the poly(vinyl chloride) and low molecular weight poly(α-methylstyrene) were found to be compatible.

The following examples serve to illustrate but not to limit the present invention.

The grafting of poly(α-methylstyrene) from poly(vinyl chloride) was carried out at polymerization temperatures of −30° C., −10° C., and 25° C. The grafting was carried out in a reaction vessel fitted with a stirrer and heating and/or cooling means. The grafting was conducted in the presence of argon or nitrogen in order to graft under controlled or inert conditions.

Geon® Resin 110×377 poly(vinyl chloride) was dissolved in 1,2-dichloroethane so that the poly(vinyl chloride) was present in solution at 1 weight percent based on the total weight of the poly(vinyl chloride) and solvent.

The solution of poly(vinyl chloride) was either heated or cooled to one of the above stated temperature ranges. α-Methylstyrene was then added to the solution in the amount of 0.4 moles per liter of solvent. 3.5 to $4.0\times10^{-2}$ moles per liter of diethylaluminum chloride as catalyst was also added to the solution over a period of 10 minutes in order to maintain consistency of temperature.

The reaction solution was mixed and allowed to proceed for 60 minutes, thus forming the poly(vinyl chloride)-g-poly (α-methylstyrene) of the present invention. The reaction was terminated with methanol. The solvents were then evaporated, leaving the poly(vinyl chloride)-g-poly(α-methylstyrene) plus catalyst residues. The grafted poly(vinyl chloride) was purified by redissolving it in tetrahydrofuran, and centrifuged for one hour in order to remove the catalyst residues.

Table I sets forth experimental data obtained from the graft copolymerization at the various polymerization temperatures.

TABLE I

The Effect of Temperature on PVC Grafting of Poly(α-methylstyrene)

| Temperature °C. | $G^1_{eff}$ % | $G^2_{P\alpha MeSt}$ % | Mn graft copolymer (×10³ g/mol) | Mw graft copolymer (×10³ g/mol) | Mn of α-methylstyrene extracted from the graft copolymer (10³ g/mol) | α-Methylstyrene branches per polymer chain |
|---|---|---|---|---|---|---|
| 25 | 9.4 | 26.2 | 49.6 | 96.0 | 7.1 | 1.8 |
| −10 | 8.7 | 24.7 | 48.6 | 98.0 | 7.6 | 1.5 |
| −30 | 9.2 | 25.6 | 49.2 | 94.5 | 7.9 | 1.6 |

$G^1_{eff}$ = Grafted PαMeSt/(Grafted PαMeSt + Homo- PαMeSt);
$G^2_{P\alpha MeSt}$ = Weight of Grafted PαMeSt/Total Weight of Graft;

The transition from a glass to a rubber-like state is an important characteristic of polymer behavior, marking a region where dramatic changes in the physical properties, such as hardness and elasticity, are observed. The changes are completely reversible, however, and the transition from a glass to a rubber is a function of molecular motion. In the rubber-like state or in the melt, the polymer chains are in relatively rapid motion, but as the temperature is lowered the movement becomes progressively slower until eventually the available thermal energy is insufficient to overcome the rotational energy barriers in the chain. At this temperature, which is known as the glass transition temperature, the chains become locked in whichever conformation they possessed when the glass transition temperature was reached. Below the glass transition temperature, the polymer is in the glassy state and is, in effect, a frozen liquid. The temperature at which the glass transition temperature is observed depends largely on the nature of the polymer chain. It is quite obvious that the glass transition temperature is an important characteristic of any polymer as it has an important bearing on the potential application of a polymer.

The magnitude of glass transition temperature varies over a wide temperature range for different polymers. Poly(vinyl chloride) generally has a glass transition temperature from 81° C. to 83° C. and poly(α-methylstyrene) generally has a glass transition temperature of about 172° C. The glass transition temperatures of the poly(vinyl chloride)-g-poly(α-methylstyrene), poly(vinyl chloride), and α-methylstyrene, which were utilized to synthesize the poly(vinyl chloride)-g-poly(α-methylstyrene), were measured by differential scanning calorimetry. Results are summarized in Table II.

TABLE II

The Glass Transition Temperatures of poly(vinyl chloride)-g-(α-methylstyrene)

| Sample No. | Compositions | Tg (C°) |
|---|---|---|
| 1[a] | PVC-g-poly(α-methylstyrene) | 111.5 |
| 2[b] | PVC-g-poly(α-methylstyrene) | 113.0 |
| 3 | PVC | 81.5 |
| 4 | poly(α-methylstyrene) (extracted) | 146.5 |
| 5[a] | Physical mixture of PVC (70%) + poly(α-methylstyrene) (30%) | 78.5, 152.2 |
| 6 | poly(α-methylstyrene) | 172 |

[a]powders precipitated from THF solution by methanol;
[b]films cast from THF solution Weight losses of poly(vinyl chloride)-g-poly(α-methylstyrene) were measured by thermal gravimetric analysis (TGA). Two peaks at 197° C. and 297° C. were observed, responsible for poly(α-methylstyrene) and poly(vinyl chloride) respectively. Evidently, these two polymers heat-degrade independently of each other.

As can be seen from Table II, the poly(vinyl chloride)-g-poly(α-methylstyrene) of the present invention has a single glass transition temperature which ranges generally from about 100° C. or 110° C. to about 125° C. or 130° C. even though the graft comprises two distinct polymers. The single glass transition temperature poly(halogen containing polymer)-g-poly(aromatic) such as polyvinyl chloride)-g-poly(α-methylstyrene) can be utilized as a high heat distortion temperature poly(vinyl chloride) type material. That is, the poly(vinyl chloride)-g-poly(α-methylstyrene) offers greater service temperatures than poly(vinyl chloride). Applications include any of the numerous articles currently made from poly(vinyl chloride) such as water pipe and vinyl siding.

The halogen containing polymers grafted with aromatic compounds, such as poly(vinyl chloride)-g-poly(α-methylstyrene) graft copolymer, of the present invention are also effective compatibilizing agents for chlorine containing polymers and aromatic compounds having from 8 to about 12 carbon atoms such as polystyrene and poly(α-methylstyrene). Polymers which can be compatibilized with the grafts include chlorine containing polymers such as poly(vinyl chloride), chlorinated polyvinyl chloride), copolymers thereof as set forth above such as with poly (vinyl chloride) and methyl methacrylate, and the like on the one hand and poly(α-methylstyrene), polystyrene, poly (phenylene oxide), poly(dimethylphenylene oxide) and the like on the other hand.

The amount of the halogen or chlorine containing polymers, such as polyvinyl chloride) generally ranges from about 20 to about 99 or 100 parts by weight and desirably from about 50 to about 90 parts by weight based upon 100 total parts by weight of the blended halogen or chlorine containing polymers and aromatic containing polymers.

It has been found that the amount by weight of the halogenated polymer-g-poly(aromatic compound) graft copolymer, such as poly(vinyl chloride)-g-poly(α-methylstyrene), compatibilizing agent utilized to blend the above noted polymers together generally ranges from about 1, 15 or 20 to about 25, 50 or 70, and desirably from about 20, 21 or 25 to about 55 or 60 parts by weight based upon 100 total parts by weight of the blended polymers (halogenated polymer and aromatic containing polymers) and compatibilizing agent.

To test compatibilizing ability of poly(vinyl chloride)-g-poly(α-methylstyrene), solution blending of poly(vinyl chloride) and poly(α-methylstyrene) was conducted. The poly(vinyl chloride) utilized was Geon ® Resin 110×377. The poly(α-methylstyrene) utilized was the homopolymer from grafting polymerization by extraction (Mn~8000 g/mol). The poly(vinyl chloride)-g-poly(α-methylstyrene) was synthesized at -31 30° C. Films were cast from concentrated polymer solutions (5% w/v in THF) on the surface of an aluminum pan. Blending results are summarized in Table III.

TABLE III

Blending Test of Poly(vinyl chloride)-g-poly(α-methylstyrene)

| Sample No. | PVC | Poly (α-methyl-styrene) | Poly(vinyl chloride-g-α-methylstyrene) | Visual observation |
| --- | --- | --- | --- | --- |
| 1 | 50 | 50 | — | opaque islands in a transparent matrix film (phase separation) |
| 2 | 40 | 40 | 20 | tiny granular islands in a homogeneous matrix film (some phase separation) |
| 3 | 25 | 25 | 50 | homogeneous transparent film (no phase separation) |
| 4 | — | 50 | 50 | homogeneous transparent film (no phase separation) |
| 5 | 70 | 30 | — | opaque islands in a transparent matrix film (phase separation) |
| 6 | 70 | 30 | 20 | homogeneous transparent film (no phase separation) |

Table III shows that poly(vinyl chloride)-g-poly(α-methylstyrene) is an effective compatibilizer for blends of poly(vinyl chloride) and α-methylstyrene.

In accordance with the patent statutes, the best mode and preferred embodiment have been set forth, and the scope of the present invention is not limited thereto, but rather by the scope of the attached claims.

What is claimed is:

1. A graft copolymer, comprising:
a chlorine containing polymer having at least one pendant polymer chain derived from α-methylstyrene, said graft copolymer having a single glass transition temperature, and said at least one polymer chain derived from α-methylstyrene having a number average molecular weight from about 500 to about 10,500.

2. A graft copolymer according to claim 1, wherein said chlorine containing polymer is poly(vinyl chloride), or a copolymer derived from vinyl chloride and a comonomer.

3. A graft copolymer according to claim 2, wherein said chlorine containing polymer is poly(vinyl chloride), and wherein the number of pendant polymer chains derived from α-methylstyrene is from about 1 to about 50 per chlorine containing polymer chain.

4. A graft copolymer according to claim 3, wherein the molecular weight of said at least one polymer chain derived from α-methylstyrene is about 3,000 to about 10,000.

5. A graft copolymer according to claim 4, wherein said single glass transition temperature is from about 100° C. to about 130° C.

6. A graft copolymer according to claim 5, wherein the molecular weight of said at least one polymer chain derived from α-methylstyrene is about 5,000 to about 9,000, and wherein the single glass transition temperature is from about 110° C. to about 125° C. and wherein the chlorine containing polymer has a number average molecular weight of 5,000 to about 100,000 per polymer chain.

7. A compatibilized composition including a compatibilizing agent comprising the graft copolymer composition of claim 1, a chlorine containing polymer, and an aromatic polymer.

8. A compatibilized composition including a compatibilizing agent comprising the graft copolymer composition of claim 3, a chlorine containing polymer, and an aromatic polymer, wherein said chlorine containing polymer is poly (vinyl chloride), chlorinated poly(vinyl chloride), or a copolymer of poly(vinyl chloride) or chlorinated poly(vinyl chloride), and wherein said aromatic polymer is poly(α-methylstyrene), polystyrene, poly(phenylene oxide), or poly (dimethylphenylene oxide).

9. A compatibilized composition including a compatibilizing agent comprising the graft copolymer composition of claim 6, a chlorine containing polymer, and an aromatic polymer, wherein said chlorine containing polymer is poly (vinyl chloride), chlorinated poly(vinyl chloride), or a copolymer of poly(vinyl chloride) or chlorinated poly(vinyl chloride), and wherein said aromatic polymer is poly(α-methylstyrene), polystyrene, poly(phenylene oxide), or poly (dimethylphenylene oxide).

10. A high heat distortion composition comprising the graft copolymer of claim 1.

11. A high heat distortion composition comprising the graft copolymer of claim 3.

12. A high heat distortion composition comprising the graft copolymer of claim 6.

13. A compatibilizing agent, comprising:
a halogen containing polymer-g-poly(vinyl substituted aromatic) copolymer having a single glass transition temperature, and wherein the number of pendant poly (vinyl substituted aromatic) chains is from about 1 to about 50 per chlorine containing polymer chain.

14. A graft copolymer according to claim 13, wherein said halogen containing polymer is poly(vinyl chloride), chlorinated poly(vinyl chloride), poly(vinylidene chloride) or a copolymer derived from vinyl chloride and a comonomer, and wherein there are from about 1 to about 30 said pendant chains per halogen containing polymer backbone chain.

15. A graft copolymer according to claim 14, wherein the number average molecular weight of said at least one aromatic containing polymer pendant chain is about 10,000 or less.

16. A graft copolymer according to claim 15, wherein said halogen containing polymer is poly(vinyl chloride), and wherein at least one aromatic containing polymer is poly(α-methylstyrene), and wherein said at least one poly(α-methylstyrene) pendant chain has a number average molecular weight from about 500 to about 10,500.

17. A graft copolymer according to claim 16, wherein said single glass transition temperature is from about 100° C. to about 130° C.

18. A graft copolymer according to claim 17, wherein the number average molecular weight of said poly(vinyl chloride) is from about 5,000 to about 100,000, and wherein the number average molecular weight of said (α-methylstyrene pendant chain is from about 3,000 to about 10,000.

19. A high heat distortion composition comprising the graft copolymer of claim 13.

20. A high heat distortion composition comprising the graft copolymer of claim 16.

21. A compatibilized composition including a compatibilizing agent comprising the graft copolymer of claim 13, a chlorine containing polymer, and an aromatic polymer derived from a vinyl substituted aromatic having from 8 to 12 carbon atoms.

22. A compatibilized composition including a compatibilizing agent comprising the graft copolymer of claim 14, a chlorine containing polymer, and an aromatic polymer, wherein said chlorine containing polymer is poly(vinyl chloride), chlorinated poly(vinyl chloride), or a copolymer of poly(vinyl chloride) or chlorinated poly(vinyl chloride), and wherein said aromatic polymer is poly(α-methylstyrene), polystyrene, poly(phenylene oxide), or poly(dimethylphenylene oxide).

* * * * *